US007007482B2

(12) United States Patent
Green et al.

(10) Patent No.: US 7,007,482 B2
(45) Date of Patent: Mar. 7, 2006

(54) COMBUSTION LINER SEAL WITH HEAT TRANSFER AUGMENTATION

(75) Inventors: Andrew Green, Jupiter, FL (US); Peter Stuttaford, Jupiter, FL (US); Jeffrey Arthur Benoit, Palm City, FL (US); Vamsi Duraibabu, Jupiter, FL (US); Hany Rizkalla, Stuart, FL (US)

(73) Assignee: Power Systems Mfg., LLC, Jupiter, FL (US)

( * ) Notice: Subject to any disclaimer, the term of this patent is extended or adjusted under 35 U.S.C. 154(b) by 0 days.

(21) Appl. No.: 10/856,592

(22) Filed: May 28, 2004

(65) Prior Publication Data

US 2005/0262844 A1 Dec. 1, 2005

(51) Int. Cl.
*F02C 7/12* (2006.01)
(52) U.S. Cl. ........................................ 60/752; 60/39.37
(58) Field of Classification Search .................. 60/752, 60/39.37, 760
See application file for complete search history.

(56) References Cited

U.S. PATENT DOCUMENTS

| 5,353,865 | A | 10/1994 | Adiutori et al. |
| 5,460,002 | A | 10/1995 | Correa |
| 5,724,816 | A | 3/1998 | Ritter et al. |
| 6,334,310 | B1 | 1/2002 | Sutcu et al. |
| 6,427,446 | B1 | 8/2002 | Kraft et al. |
| 6,446,710 | B1 | 9/2002 | Beeck et al. |
| 6,468,669 | B1 | 10/2002 | Hasz et al. |
| 6,526,756 | B1 | 3/2003 | Johnson et al. |
| 6,546,730 | B1 | 4/2003 | Johnson et al. |
| 6,589,600 | B1 | 7/2003 | Hasz et al. |
| 6,598,781 | B1 | 7/2003 | Hasz et al. |
| 2002/0066273 | A1* | 6/2002 | Kitamura et al. ............. 60/737 |
| 2002/0148228 | A1* | 10/2002 | Kraft et al. .................... 60/772 |

OTHER PUBLICATIONS

R.L. Webb, E.R. G. Eckert, R.J. Goldstein Heat Transfer and Friction in Tubes With Repeated-Rib Roughness Int. J. Heat Mass Transfer, vol. 14, pp 601-617, Mar. 12, 1970 Pergamon Press 1971, Great Britain.

* cited by examiner

*Primary Examiner*—Ehud Gartenberg
(74) *Attorney, Agent, or Firm*—Brian R. Mack; Christopher Hayes

(57) ABSTRACT

A gas turbine combustion liner is disclosed having an alternate interface region between it and a transition duct where the cooling effectiveness and heat transfer along the aft end of the combustion liner is improved, resulting in extended component life. The region of the combustion liner proximate its second end comprises a plurality of first feed holes, a plurality of spring seals that seal against a transition duct, a cooling ring having a plurality of second feed holes, that with the first feed holes pass a cooling fluid into an annulus formed between the cooling ring and combustion liner. The cooling fluid passes over a means for augmenting the heat transfer proximate the combustion liner second end, wherein the heat transfer augmentation preferably comprises a plurality of raised ridges that increases the surface area of the outer liner wall to turbulate the cooling fluid and maximize the cooling effectiveness.

17 Claims, 6 Drawing Sheets

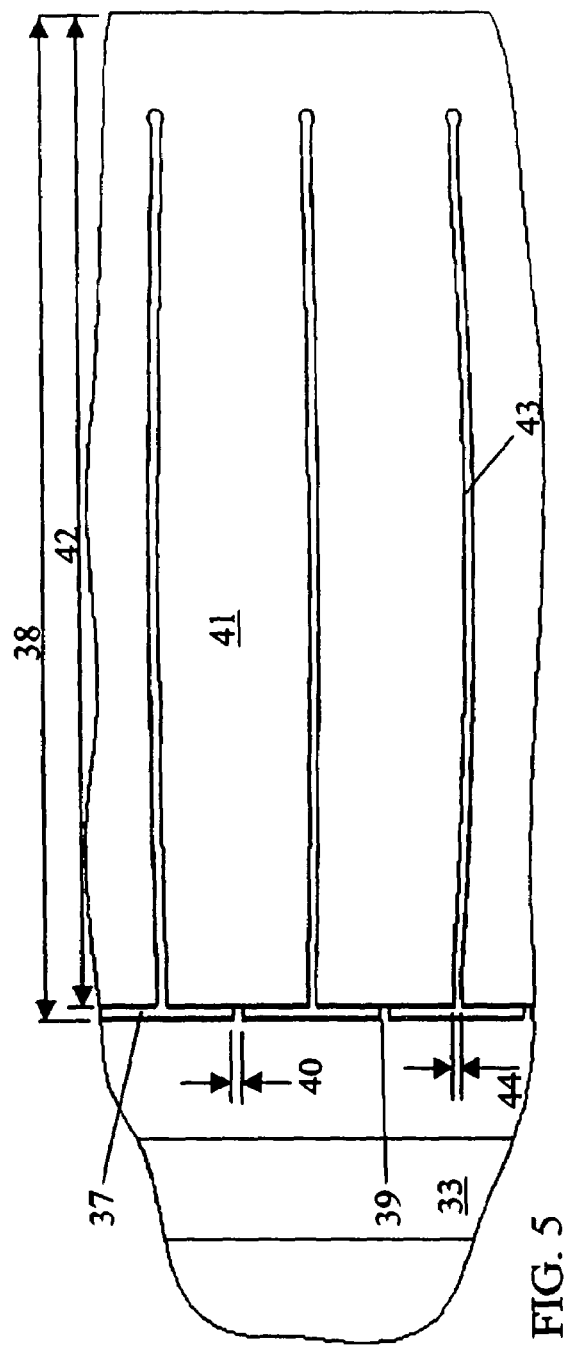
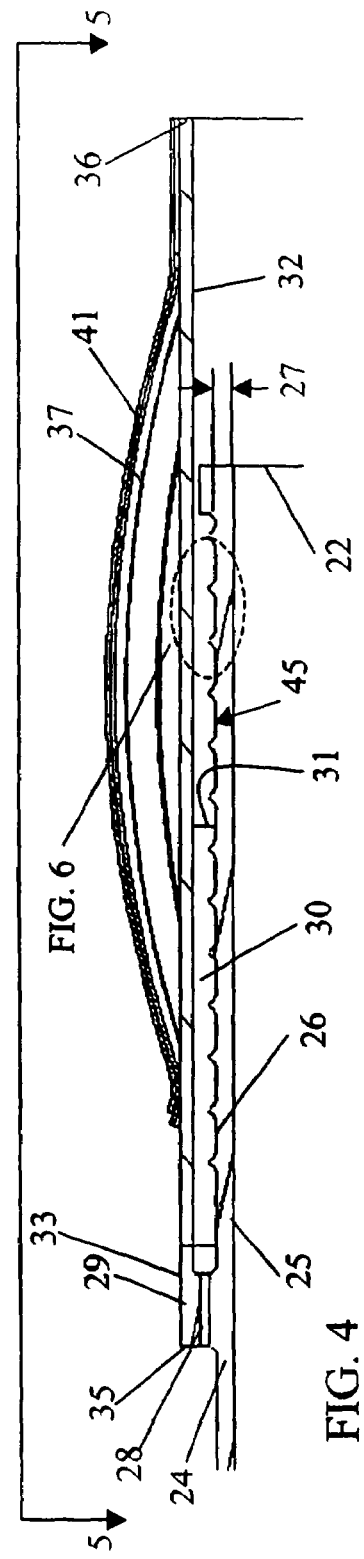

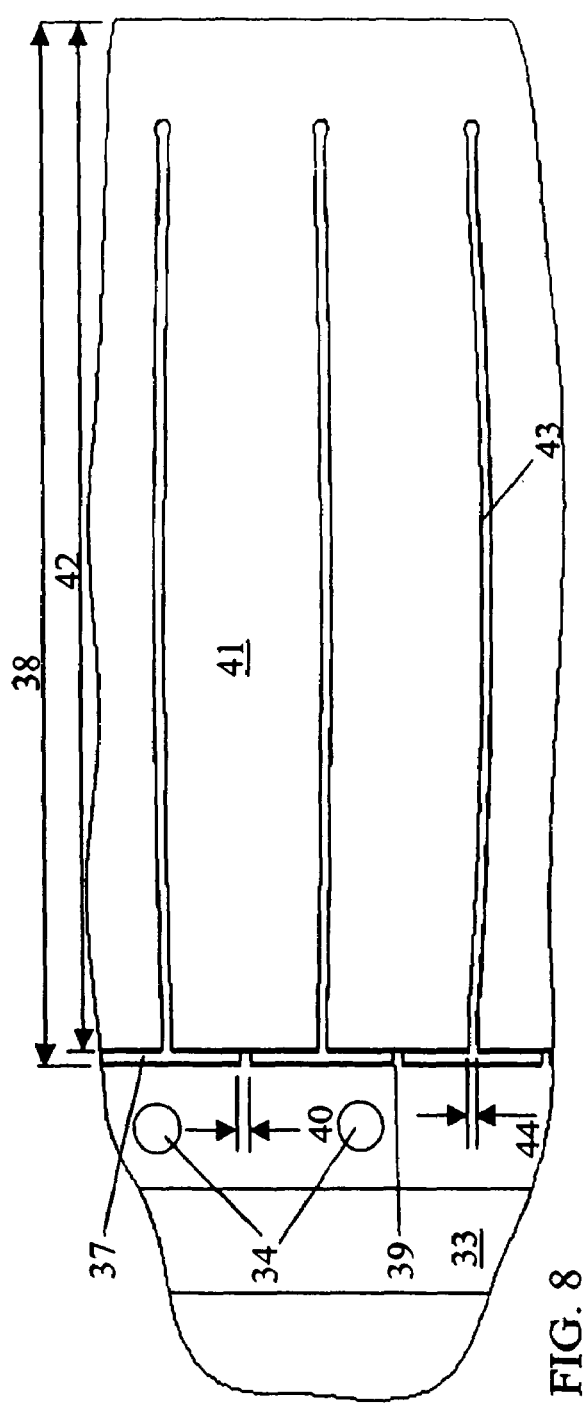
FIG. 8
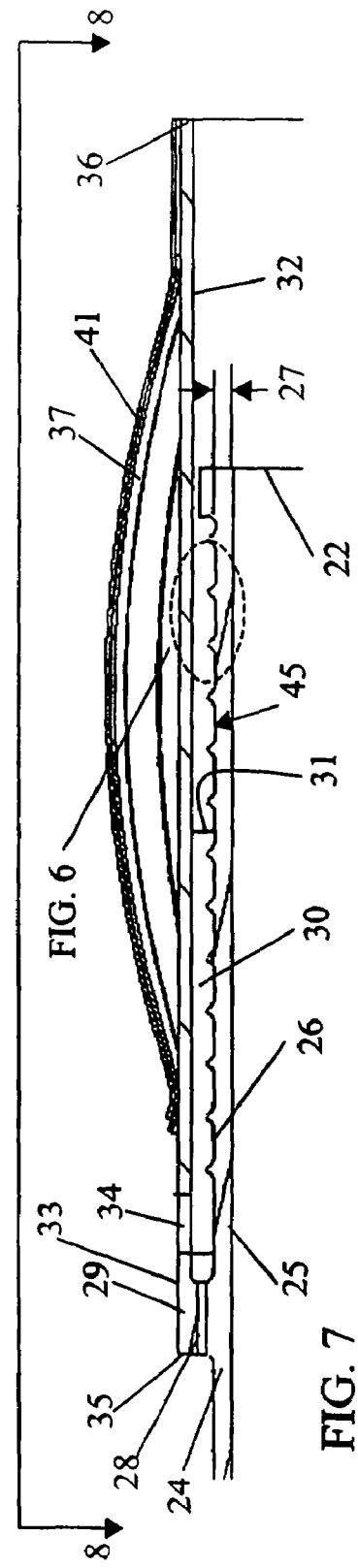
FIG. 6
FIG. 7

COMBUSTION LINER SEAL WITH HEAT TRANSFER AUGMENTATION

TECHNICAL FIELD

This invention relates in general to gas turbine engines and more specifically to the cooling and sealing arrangement of the aft end of a combustion liner.

BACKGROUND OF THE INVENTION

A gas turbine engine typically comprises at least one combustor, which mixes air from a compressor with a fuel. This fuel and air mixture combusts after being introduced to an ignition source. The resulting hot combustion gases pass through the combustion system and into a turbine, where the gases turn the turbine and associated shaft. A gas turbine engine is most commonly used for either propulsion for propelling a vehicle or harnessing the rotational energy from the engine shaft to drive a generator for producing electricity. Most land-based gas turbine engines employ a plurality of combustors arranged in a can-annular layout around the engine. Referring to FIG. 1, a representative land based gas turbine engine 10 of the prior art is shown in partial cross section. Gas turbine engine 10 comprises an inlet region 11, an axial compressor 12, a plurality of combustors 13, each in fluid communication with a transition duct 14, which are in fluid communication with a turbine 15. The hot combustion gases drive the turbine, which turns shaft 17 before exiting through outlet 16. Shaft 17 is coupled to the compressor, and for power generation, to an electrical generator (not shown).

The operating temperatures of the combustors 13 are typically well over 3000 degrees Fahrenheit, while the temperature limits of the materials comprising combustors 13 are much lower. Therefore, in order to maintain the structural integrity for continued exposure to the hot combustion gases, combustors 13 are cooled, typically by air from compressor 12. However, it is critical to only use the minimal amount of cooling air necessary to lower the operating metal temperatures of combustor 13 to within the acceptable range, and not use more air than necessary nor allow any cooling air leakage.

In order to maximize the efficiency of the gas turbine engine, it is imperative to minimize any leakage of air from compressor 12 that is not intended for cooling combustors 13, such that all air not intended for cooling, passes through combustors 13 and undergoes combustion. Leakage areas are especially common between mating components such as the interface region between combustor 13 and transition duct 14. Seals or tight tolerances between such mating components are typically employed to overcome such leakages that can reduce overall performance and efficiency. However, it is also imperative to provide adequate cooling to an interface region.

Some examples of prior art seals and cooling designs for the interface region between combustor 13 and transition duct 14 are disclosed in U.S. Pat. Nos. 5,724,816 and 6,334,310. The '816 patent pertains to a plurality of axial channels that are formed between an inner member and an outer member and can be used to cool the aft end section of a combustion liner where it interfaces with a transition duct. An example of this configuration is shown in FIG. 2 where a combustion liner is provided having a plurality of axial cooling channels 18. The '310 patent pertains to an alternate manner to cool this same region of a combustion liner and can be used in conjunction with the prior art combustion liner shown in FIG. 2. Specifically, a combustion liner includes an outer cooling sleeve that contains a plurality of cooling holes 19 for supplying cooling air to the region between the liner and the outer cooling sleeve. The outer cooling sleeve includes a swaged end such that when the outer cooling sleeve is welded to the combustion liner the stresses imparted to the outer cooling sleeve by a transition duct are moved away from the weld joint. Often times these combustion liners are also accompanied by at least one spring seal for sealing against the inner wall of a transition duct.

While each of these designs are directed towards providing adequate cooling at the interface region of a combustion liner and transition duct, improvements can be made such that cooling effectiveness is improved, extending component life, while simultaneously minimizing unnecessary cooling air leakage.

SUMMARY AND OBJECTS OF THE INVENTION

The present invention seeks to provide a combustion liner having an alternate interface region between it and a transition duct where the cooling effectiveness along the aft end of the combustion liner is improved, resulting in extended component life. The combustion liner comprises a first liner end, a second liner end, and is formed from two portions, with the second portion fixed to the first portion and extending to the second end. The second portion comprises an inner liner wall, an outer liner wall, a plurality of first feed holes, a cooling ring fixed to the outer liner wall radially outward thereof and defining an annulus therebetween. The cooling ring has a cooling ring inner wall, cooling ring outer wall, and, in an alternate embodiment, further comprises a plurality of second feed holes extending therebetween. The second portion further comprises a first spring seal adjacent to the cooling ring outer wall, a second spring seal adjacent the first spring seal. Each of the first and second spring seals contain a plurality of axial slots with the slots preferably offset circumferentially. The second spring seal is positioned over the first spring seal to limit any leakage of cooling air through the plurality of first axial slots. Cooling air is directed into the annulus from first and second feed holes and across a means for augmenting the heat transfer along the outer liner wall before providing cooling to the cooling ring inner wall.

It is an object of the present invention to provide a combustion liner having an interface region with a transition duct that has improved cooling effectiveness.

It is another object of the present invention to provide a means to augment the heat transfer along a portion of a combustion liner outer wall.

In accordance with these and other objects, which will become apparent hereinafter, the instant invention will now be described with particular reference to the accompanying drawings.

BRIEF DESCRIPTION OF DRAWINGS

FIG. 4 is a detailed cross section of a portion of a combustion liner in accordance with the preferred embodiment of the present invention.

FIG. 5 is a top view of a portion of a combustion liner in accordance with the preferred embodiment of the present invention.

FIG. 7 is a detailed cross section of a portion of a combustion liner in accordance with an alternate embodiment of the present invention.

FIG. 8 is a top view of a portion of a combustion liner in accordance with an alternate embodiment of the present invention.

DETAILED DESCRIPTION OF THE PREFERRED EMBODIMENT

Figure 1:
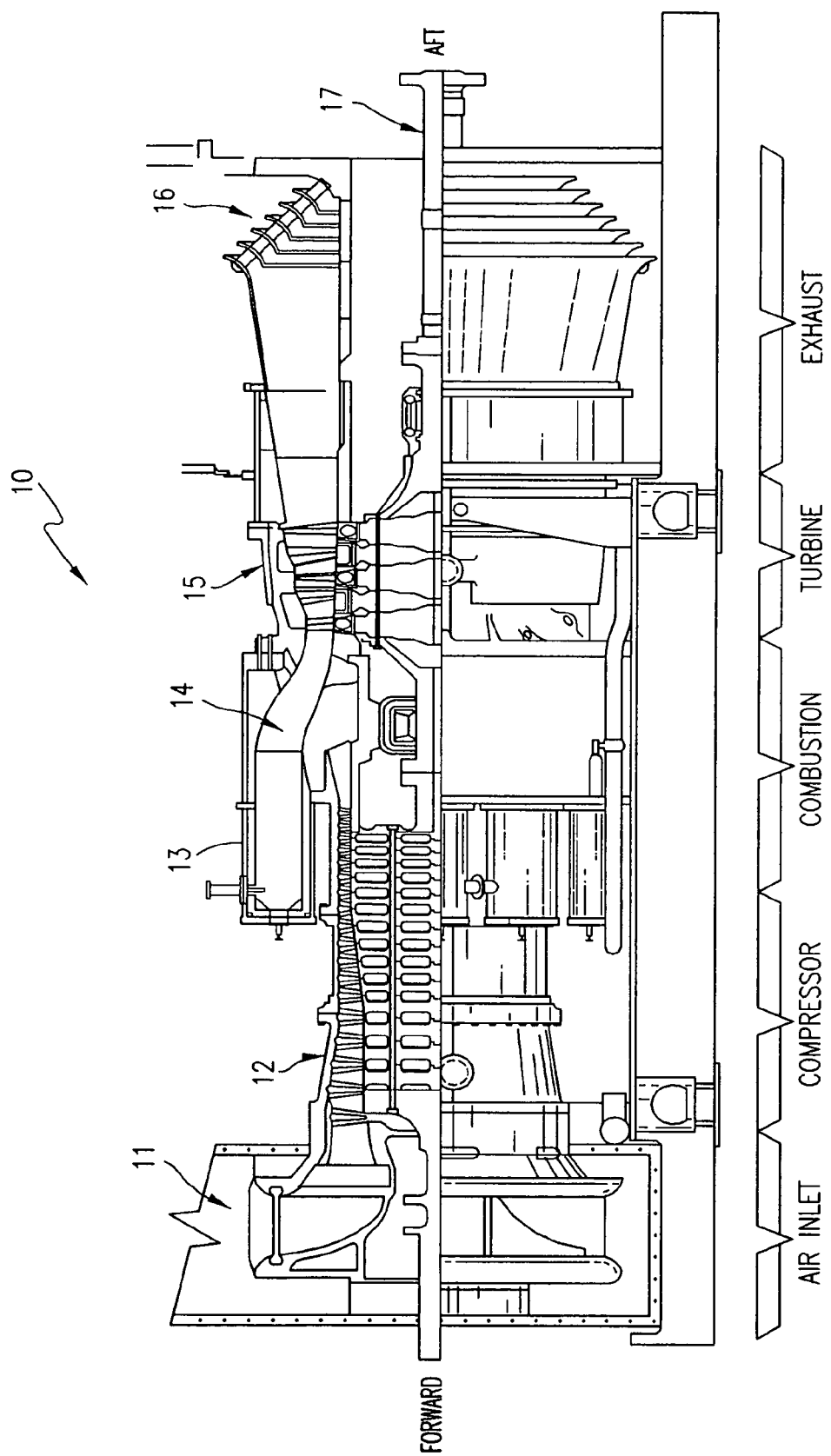
FIG. 1 is a partial cross section of a gas turbine engine of the prior art.
Figure 2:
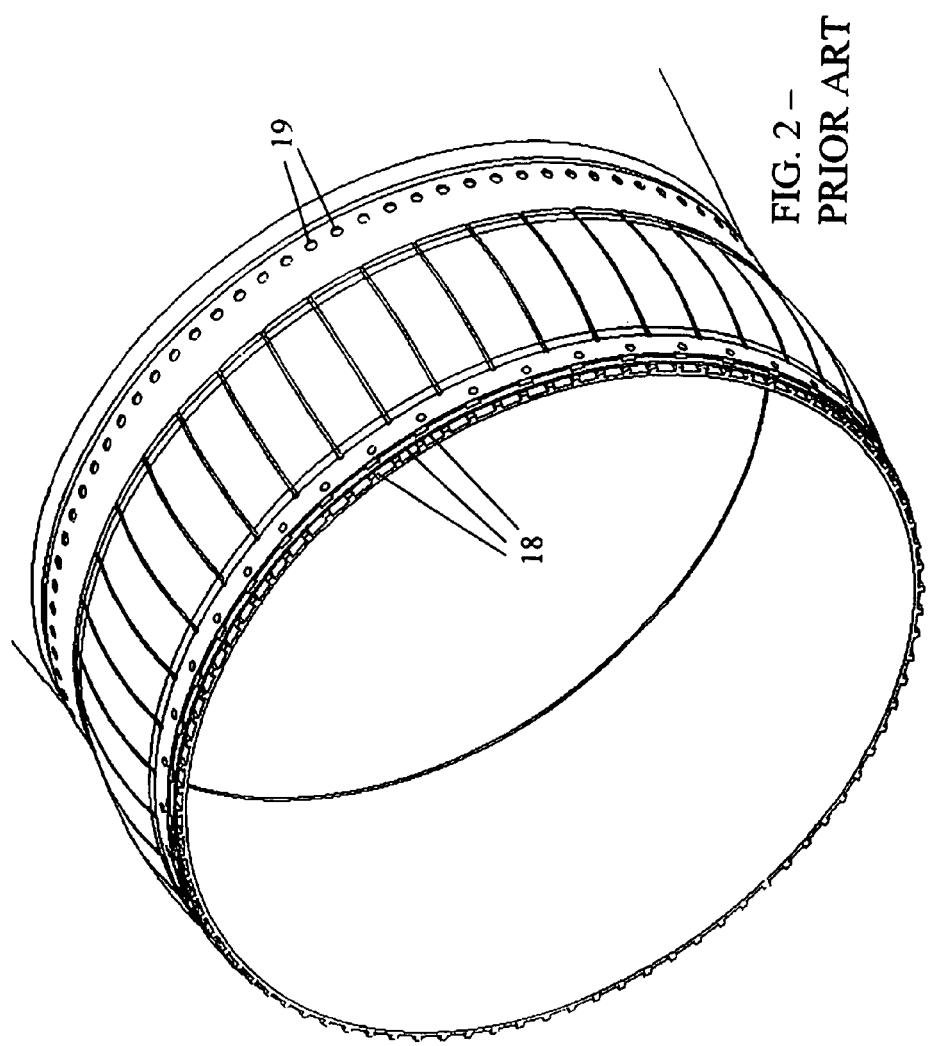
FIG. 2 is a perspective view of a portion of a prior art combustion liner.
Figure 3:
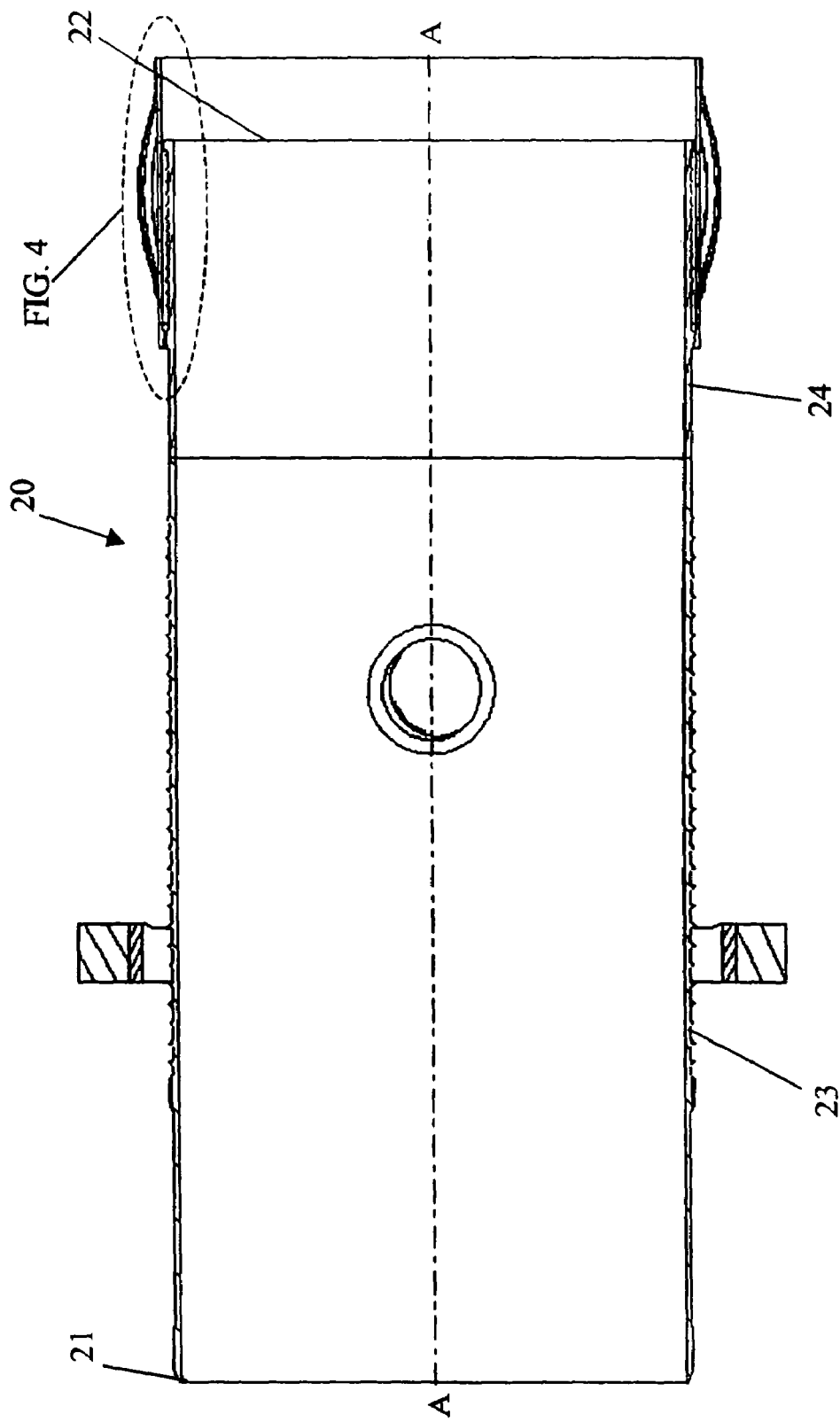
FIG. 3 is a cross section of a combustion liner in accordance with the preferred embodiment of the present invention.

The preferred embodiment of the present invention is shown in detail in FIGS. 3–7. Referring now to FIG. 3, combustion liner 20, which is shown in cross section, interfaces with a transition duct similar to that of transition duct 14 in FIG. 1. Combustion liner 20 comprises a first end 21, a second end 22, and a centerline A—A. Located proximate first end 21 is a first portion 23 that is generally cylindrical in shape. Fixed to first portion 23 and extending towards second end 22 is a second portion 24. Second portion 24 is shown in greater detail in FIG. 4 and comprises an inner liner wall 25 and outer liner wall 26 in spaced relation to form a liner wall thickness 27. Located generally parallel to centerline A—A of combustion liner 20, in a raised section of second portion 24, is a plurality of first feed holes 28.

Second portion 24 further comprises a cooling ring 29 in fixed relation to outer liner wall 26 and located radially outward of outer liner wall 26 to thereby form an annulus 30 therebetween, with annulus 30 having an annulus height 31. Plurality of first feed holes 28 are positioned such that they terminate at annulus 30. Cooling ring 29 has a cooling ring inner wall 32, a cooling ring outer wall 33, a first cooling ring end 35, and a second cooling ring end 36. Furthermore, cooling ring 29 is preferably fixed to outer liner wall 26 proximate first cooling ring end 35 while second cooling ring end 36 extends axially beyond second liner end 22, as shown in FIG. 4.

Referring now to FIGS. 4 and 5, a first spring seal having a first length 38 and a plurality of first axial slots 39 with each of first axial slots 39 having a first width 40 is located adjacent to cooling ring outer wall 33. Adjacent to and radially outward of first spring seal 37 is a second spring seal 41 having a second length 42 and a plurality of second axial slots 43 with each of second axial slots 43 having a second width 44. The spring seals, which are preferably fixed proximate second cooling ring end 36 and offset circumferentially, serve to minimize the leakage of any cooling air into a transition duct while providing a compliant seal capable of adjusting to various clearances and tolerances. In order to minimize the leakage while providing a compliant seal, first length 38 is close in length to second length 42, yet greater. To further reduce the leakage through spring seals 37 and 41, first width 40 of first axial slot 39 and second width 44 of second axial slot 43 are substantially equal to each other and of the size to allow for seal compliance and compression while minimizing cooling flow through slots 39 and 43.

Figure 6:
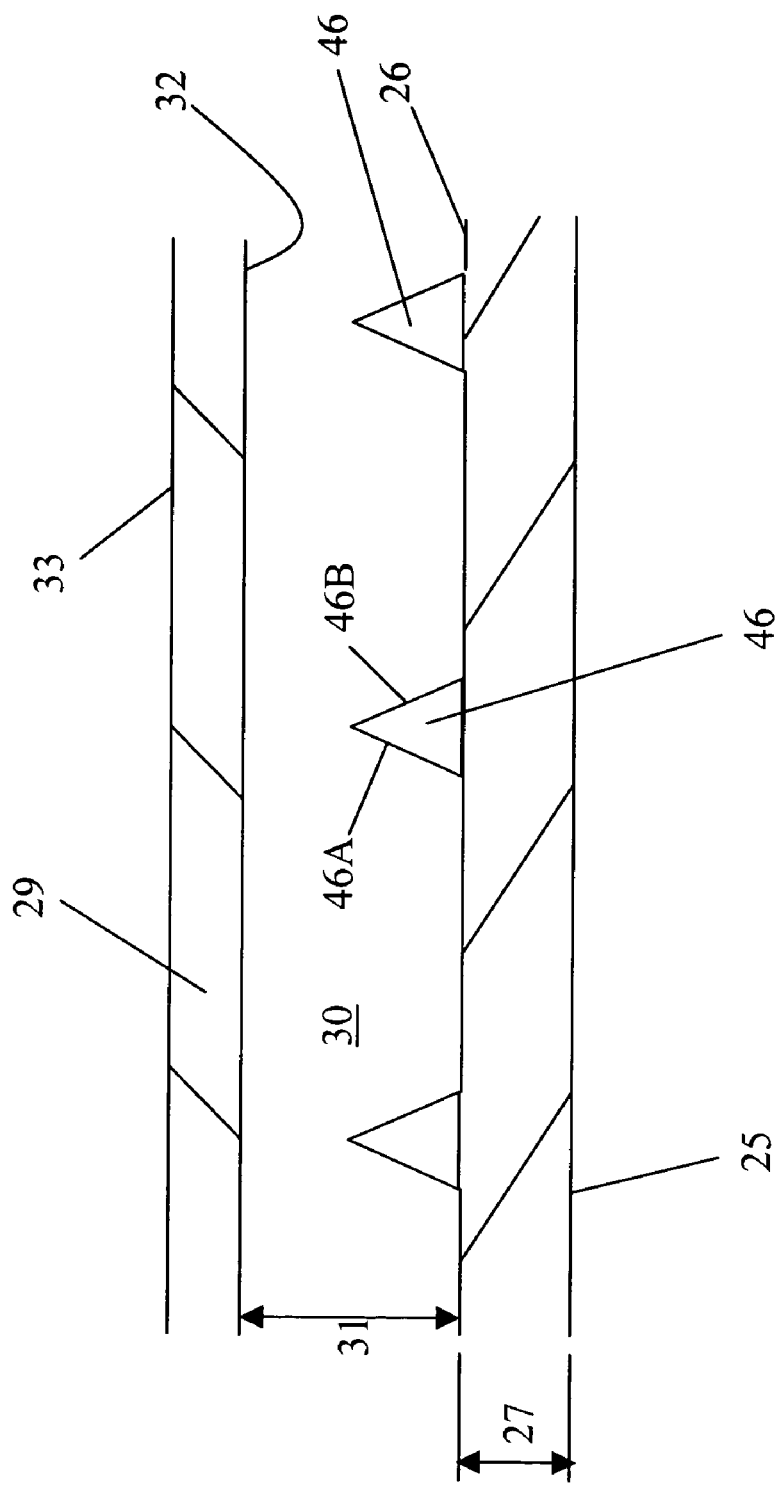
FIG. 6 is a further detailed cross section view of a portion of a combustion liner in accordance with the preferred embodiment of the present invention.

A critical feature to the successful cooling of second portion 24 within the region surrounded by cooling ring 29 is the addition of a means for augmenting the heat transfer 45 along outer liner wall 26. Referring to FIGS. 4 and 6, the heat transfer augmentation means 45 preferably comprises a plurality of raised ridges 46 that extend into annulus 30, with each of raised ridges 46 comprising at least a first surface 46A and second surface 46B. In the embodiment shown in the enclosed figures, raised ridges 46 have a generally triangular cross sectional configuration. While this is the preferred embodiment, other geometric ridge configurations are possible that can provide similar heat transfer augmentation. In the preferred embodiment, in order to achieve optimum heat transfer across second portion 24 contained within cooling ring 29, raised ridges 46 extend into annulus 30 approximately between 5% and 60% of annulus height 31.

In operation, a cooling fluid, typically air, surrounds combustion liner 20 and a portion of the air enters annulus 30 through plurality of first feed holes 28 and second feed holes 34. The cooling air then passes over raised ridges 46. Incorporating raised ridges 46 increases the overall surface area of outer liner wall 26 that is cooled by the passing cooling air, thereby enhancing the heat transfer and cooling effectiveness through liner wall thickness 27. The cooling air then exits annulus 30 and passes along cooling ring inner wall 32 before exiting combustion liner 20 into a transition duct.

An alternate embodiment of the present invention is shown in FIGS. 8 and 9. In this alternate embodiment all of the features of the preferred embodiment are present as well as a plurality of second feed holes 34 that extend between cooling ring inner wall 32 and cooling ring outer wall 33. Plurality of second feed holes 34 are preferably oriented generally perpendicular to cooling ring outer wall 33 and to plurality of first feed holes 28. Second feed holes 34 provide a source of additional cooling fluid to annulus 30. The diameter and quantity of second feed holes 34 is dependent on the amount of cooling fluid required.

While the invention has been described in what is known as presently the preferred embodiment, it is to be understood that the invention is not to be limited to the disclosed embodiment but, on the contrary, is intended to cover various modifications and equivalent arrangements within the scope of the following claims.

What we claim is:

1. A combustion liner for a gas turbine engine, said combustion liner comprising:
    a centerline, a first liner end, a second liner end, a first portion proximate said first end, and a second portion fixed downstream to said first portion and extending to said second end, said second portion comprising:
    an inner liner wall;
    an outer liner wall;
    said second end being a downstream end of said liner;
    a plurality of first feed holes parallel to said centerline;
    a cooling ring in fixed relation to said outer liner wall and located radially outward of said outer liner wall to thereby form an annulus therebetween having an annulus height, said cooling ring having a cooling ring inner wall, a cooling ring outer wall, a first cooling ring end, and a second cooling ring end;
    a first spring seal overlapping said cooling ring outer wall and having a first length and a plurality of first axial slots, with each of said first axial slots having a first width;

a second spring seal overlapping said first spring seal and having a second length and a plurality of second axial slots, with each of said second axial slots having a second width;

a means for augmenting the heat transfer along said outer liner wall downstream said plurality of first feed holes;

said first and second spring seals axially overlapping a region of said means for augmenting the heat transfer; and, wherein said first feed holes terminate at said annulus.

2. The combustion liner of claim 1 wherein said cooling ring is fixed to said outer liner wall proximate said first cooling ring end.

3. The combustion liner of claim 1 wherein said second cooling ring end extends axially beyond said second liner end.

4. The combustion liner of claim 1 further comprising a plurality of second feed holes in said cooling ring wherein said plurality of second feed holes are oriented generally perpendicular to said cooling ring outer wall.

5. The combustion liner of claim 1 wherein said first length is greater than said second length.

6. The combustion liner of claim 1 wherein said first width is substantially equal to said second width.

7. The combustion liner of claim 1 wherein said first and second spring seals are fixed to said combustion liner proximate said second end of said cooling ring.

8. The combustion liner of claim 1 wherein said means for augmenting heat transfer comprises a plurality of raised ridges extending into said annulus.

9. The combustion liner of claim 8 wherein each of said raised ridges comprises at least a first surface and a second surface.

10. The combustion liner of claim 8 wherein said raised ridges extend into said annulus approximately between 5% and 60% of said annulus height.

11. A combustion liner for a gas turbine engine, said combustion liner comprising:

a centerline, a first liner end, a second liner end, a first portion proximate said first end, and a second portion fixed downstream to said first portion and extending to said second end, said second portion comprising:

an inner liner wall;

an outer liner wall;

said second end being a downstream end of said liner;

a plurality of first feed holes parallel to said centerline;

a cooling ring in fixed relation to said outer liner wall and located radially outward of said outer liner wall to thereby form an annulus therebetween having an annulus height, said cooling ring having a cooling ring inner wall, a cooling ring outer wall, a first cooling ring end, and a second cooling ring end;

a first spring seal overlapping said cooling ring outer wall and having a first length and a plurality of first axial slots, with each of said first axial slots having a first width;

a second spring seal overlapping said first spring seal and having a second length and a plurality of second axial slots, with each of said second axial slots having a second width;

a plurality of raised ridges extending into said annulus downstream said plurality of first feed holes, with each of said raised ridges comprising at least a first surface and a second surface;

said first and second spring seals axially overlapping a region of said plurality of raised ridges; and, wherein said first feed holes terminate at said annulus.

12. The combustion liner of claim 11 wherein said cooling ring is fixed to said outer liner wall proximate said first cooling ring end.

13. The combustion liner of claim 11 wherein said second cooling ring end extends axially beyond said second liner end.

14. The combustion liner of claim 11 further comprising a plurality of second feed holes in said cooling ring wherein said plurality of second feed holes are oriented generally perpendicular to said cooling ring outer wall.

15. The combustion liner of claim 11 wherein said first length is greater than said second length.

16. The combustion liner of claim 11 wherein said first width is substantially equal to said second width.

17. The combustion liner of claim 11 wherein said first and second spring seals are fixed to said combustion liner proximate said second end of said cooling ring.

* * * * *